United States Patent [19]

Miyamoto et al.

[11] Patent Number: 5,644,722
[45] Date of Patent: Jul. 1, 1997

[54] SCHEDULE-MANAGING APPARATUS BEING CAPABLE OF MOVING OR COPYING A SCHEDULE OF A DATE TO ANOTHER DATE

[75] Inventors: Satoru Miyamoto, Tenri; Naoki Shiraishi, Nara-ken; Toshio Isoe, Tenri; Isamu Haneda, Souraku-gun, all of Japan

[73] Assignee: Sharp Kabushiki Kaisha, Osaka, Japan

[21] Appl. No.: 463,685

[22] Filed: Jun. 5, 1995

[30] Foreign Application Priority Data

Nov. 17, 1994 [JP] Japan ................................. 6-283281

[51] Int. Cl.⁶ .............................................. G06F 19/00
[52] U.S. Cl. ................................................... 395/209
[58] Field of Search ........................ 364/401 R, 468.06, 364/468.05; 395/209, 208

[56] References Cited

U.S. PATENT DOCUMENTS 5,369,570 11/1994 Parad ................................ 364/401 R
5,459,859 10/1995 Senda ............................... 364/401 R
5,463,555 10/1995 Ward et al. ....................... 364/401 R
5,519,606 5/1996 Frid-Nielsen et al. ............ 364/401 R

FOREIGN PATENT DOCUMENTS 1175069 7/1989 Japan.

Primary Examiner—Donald E. McElheny, Jr.

[57] ABSTRACT

A schedule-managing apparatus is capable of moving or copying a schedule to another date, for example, to another month than that displayed on a display section, at the time when a starting date is stored in a storing portion. A schedule-managing apparatus includes a control device for holding schedule information, stored in a storing portion as it is, while renewing stored data information according to inputted coordinates, when a user is inputting coordinates in a calendar display region by altering the coordinates successively. It further includes a scroll indication window provided adjacent to a display screen of a display portion. Finally, another control device is included for scrolling a displayed content of the display portion when the coordinate of the scroll indication window is inputted via a coordinate input device.

12 Claims, 9 Drawing Sheets

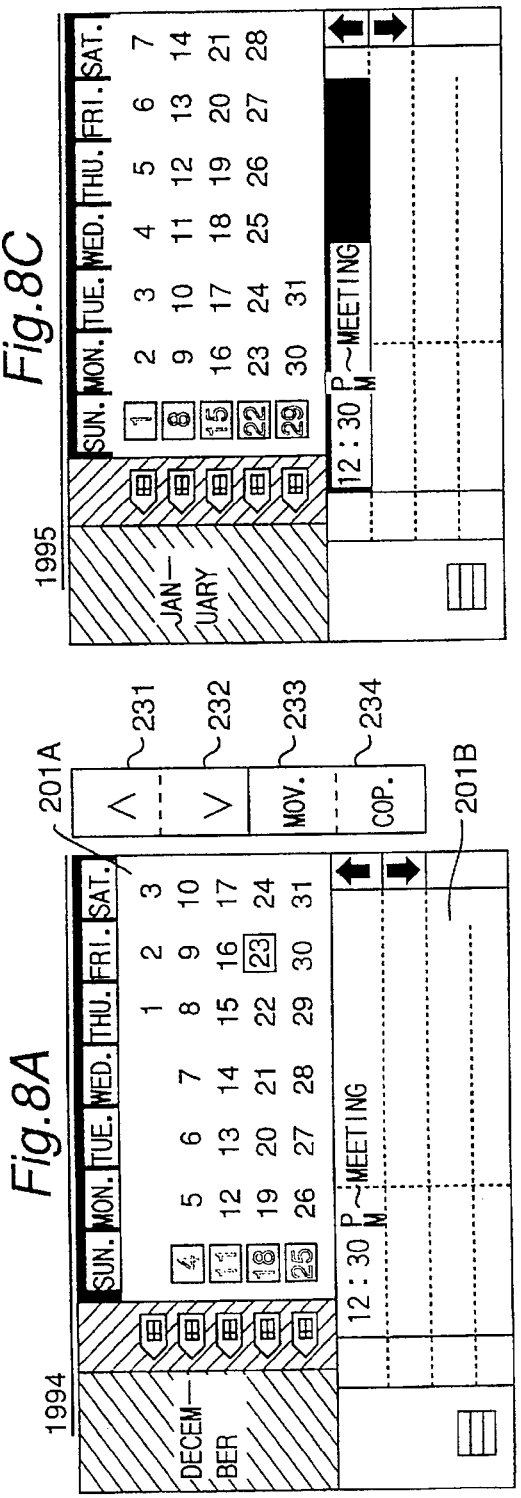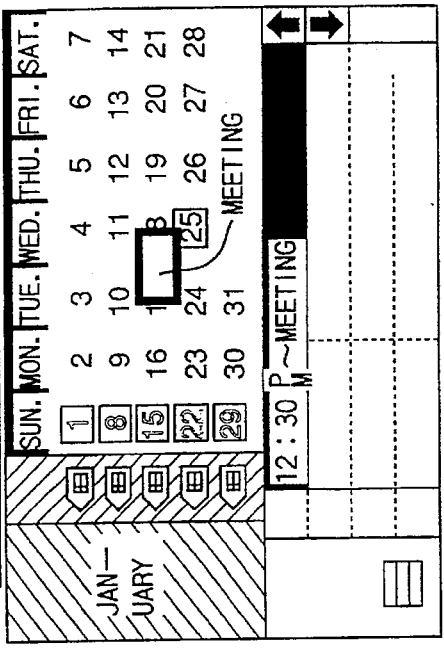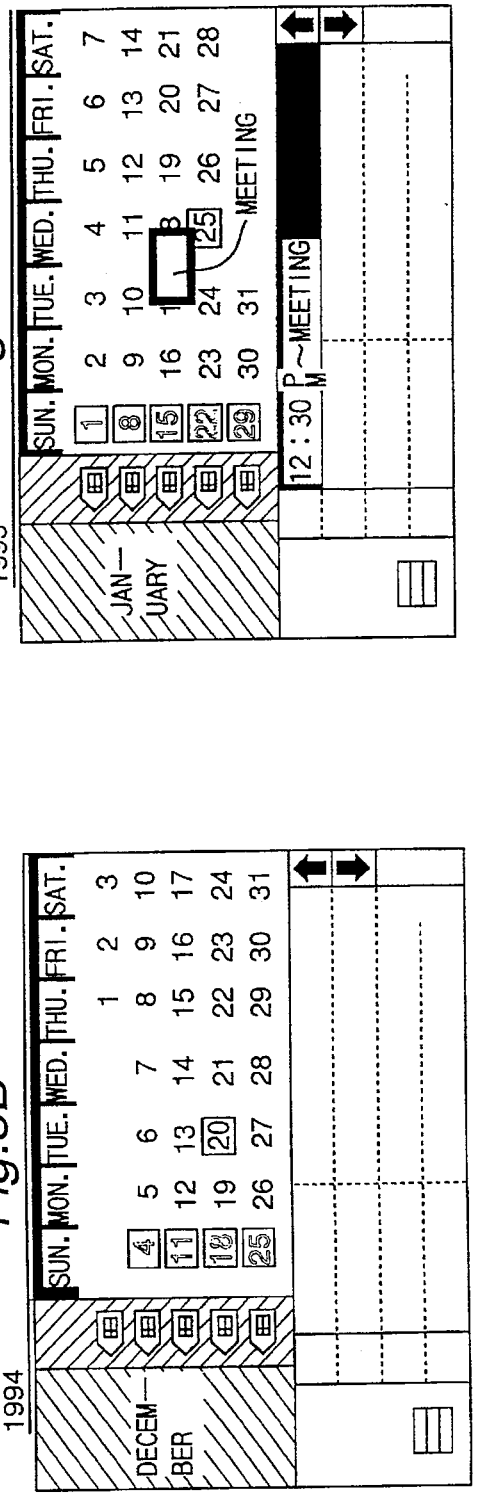

SCHEDULE-MANAGING APPARATUS BEING CAPABLE OF MOVING OR COPYING A SCHEDULE OF A DATE TO ANOTHER DATE

BACKGROUND OF THE INVENTION

1. Field of the Invention

The present invention relates to a schedule-managing apparatus and more particularly to a schedule-managing apparatus adopting a portable compact display screen.

2. Description of the Prior Art

As a conventional schedule managing apparatus there is one shown in FIG. 11 (Japanese Patent Laid-open Publication No. 1-175069). The schedule-managing apparatus comprises a processing/control section 2; a display section 3 (liquid crystal display); and a transparent tablet 1, overlaid on the display section 3, for inputting a coordinate. When a user indicates a date of a calendar displayed on the display section 3 with a pen, the transparent tablet 1 detects the indicated portion and outputs a signal indicating the indicated position to the processing/control section 2. Based on the signal, the processing/control section 2 causes the display section 3 to display a time zone of a stored schedule corresponding to the indicated date.

When an operator wants to copy a schedule (copy processing), as is shown in FIG. 12, the operator selects a to-be-copied schedule with a pen (steps S101 and S102). The processing/control section 2 decides whether a registered schedule is present at the position indicated with the pen (step S102). If YES, the content of the schedule corresponding to the indicated position is stored in a storing portion (step S103). Then, when the operator indicates a position of a date on which the schedule is to be copied, with the pen or a finger, the content of the schedule stored in the storing portion is displayed (copied) at the indicated position (steps S104 and S105) under the control of the processing/control section 2. An operation for moving the schedule of a date in a calendar to a position of a different date is performed similarly.

In the conventional schedule-managing apparatus, however, an image displayed on the screen cannot be moved while the operator is performing a schedule-moving or schedule-copying operation. Thus, a position to which a schedule is moved or a position onto which the schedule is copied is limited within a specific time zone, for example, the same month as displayed on the display section 3. In particular, the operator is inconventional when using a portable compact schedule-managing apparatus because it has a small display.

In addition, while the operator is performing a schedule-moving or schedule-copying operation, the operator cannot confirm whether or not the schedule has been stored in the storing portion or cannot check the content of the schedule stored in the storing portion.

The object of the present invention is therefore to provide an improved schedule-managing apparatus capable of moving or copying a schedule to other date, for example to other month than that displayed on the display section at the time when a starting date of moving or copying is stored in a storing portion.

It is another object of the present invention to provide a schedule-managing apparatus which allows an operator to check whether a schedule of a date has been stored in the storing portion or check the content of the stored schedule while the operator is executing an operation of moving or copying the schedule of the date to a different date.

SUMMARY OF THE INVENTION

In order to achieve the aforementioned object, there is provided a schedule-managing apparatus comprising:

an information input means for inputting date information indicating a date and schedule information indicating a schedule content;

a first storing portion for storing the date information inputted by the information input means and the schedule information corresponding to the date information correspondent to each other;

a display portion allowing a calendar of a certain period of time to be displayed on a calendar display region of a display screen;

a coordinate input means for inputting a coordinate on the display screen of the display portion;

a second storing portion capable of storing the date information of a date corresponding to the coordinate inputted by the coordinate input means and the schedule information of the date;

a first control means which extracts date and its schedule informations corresponding to the coordinate inputted by the coordinate input means from the first storing portion and causes the second storing portion to store the extracted informations, when a coordinate input is started in the calendar display region by the coordinate input means, and which causes the second storing portion to keep the schedule information as it is, while to renew the date information according to inputted coordinates, when the inputted coordinates are changed successively in the calendar display region; and a second control means for moving or copying the schedule information stored in the second storing portion in correspondence to an renewed date indicated by the date information stored in the second storing portion, when the coordinate input means has completed the successive coordinate-input, wherein a scroll indication window is provided adjacently to the display screen of the display portion so that the scroll indication window allows a coordinate thereof to be inputted continuously to the display screen by means of the coordinate input means;

the schedule-managing apparatus further comprising:

a third control means for scrolling a content displayed on the display screen when the coordinate of the scroll indication window is inputted by means of the coordinate input means.

The schedule-managing apparatus having the construction operates as follows:

An operator inputs in advance date information indicating a date and schedule information indicating a schedule content by making them correspond to each other. The first storing portion stores the date information inputted by the information input means and the schedule information corresponding to the date information, in correspondence to each other.

When the schedule-managing apparatus is in operation, the display portion allows a time zone, for example, a calendar of a month including a current date to be displayed on the calendar display region of the display screen.

Let it be supposed that the operator desires to move or copy the schedule of a given day of a certain month (starting date) to or onto a date of a different month (destination date).

The operator inputs the coordinate of the given day to be moved or to be copied in the calendar display region by means of the coordinate means. As a result, under the control of the first control means, the to-be-moved and to-be-copied date information and its schedule information are extracted from the first storing portion and stored in the second storing portion. The operator alters coordinates successively in inputting them by means of the scroll indication window in order to return or advance the month displayed on the calendar display region to a past month or a future month respectively. The second storing portion holds the schedule information stored at the start time of the input of the coordinate without changing the content of the schedule information and renews and stores the date information in accordance with the inputted coordinate while the operator is inputting the coordinate in the calendar display region controlled by the first control means by altering the coordinate successively. When the coordinate of the scroll indication window is inputted with the coordinate input means, the third control means scrolls the content displayed on the display screen. As a result, the month including the starting date can be displayed. The operator inputs the coordinate in the calendar display region by altering the coordinate successively toward the destination date. When the destination date is indicated and the successive coordinate input to be performed with the coordinate input means is completed, the second control means moves or copies the schedule information stored in the second storing means in correspondence to a renewed date indicated by the date information of the second storing means, namely, in correspondence to the destination date.

In this manner, in addition to a time zone which is displayed on the display portion when the starting date is stored, the schedule can be moved or copied to another time zone, for example to a date of a different month.

In an embodiment, the third control means scrolls the content displayed on the calendar display region by a predetermined amount, when the coordinate of the scroll indication window is inputted by means of the coordinate input means. Thus, the content displayed on the calendar display region can be prevented from being unnecessarily scrolled repeatedly. Therefore, the apparatus can be conveniently used.

In an embodiment, the display screen of the display portion includes the calendar display region allowing a calendar of a month to be displayed thereon and a schedule display region allowing the schedule information to be displayed thereon. A coordinate inputted by the operator, for example, the schedule information of the starting date can be displayed on the schedule display region. Accordingly, the calendar can be scrolled while the operator is checking the schedule content. Thus, the apparatus can be more conveniently used.

In an embodiment, under the control of the third control means, the content of the calendar display region is scrolled by one month for one input of the coordinate performed at the scroll indication window with the coordinate input means. Therefore, the operator can return the displayed month to past months or advance it to future months. Thus, the apparatus can be more conveniently used.

In an embodiment, when the successive coordinate input has been terminated at the position of the scroll indication window with the coordinate input means, the second control means move or copy the schedule information stored in the second storing portion to a date, the day of which is one at which a successive coordinate input has been started and the month of which is one displayed on the calendar display region after scrolling. Thus, when the operator moves or copies a schedule of a starting date to a date of a different month, it is unnecessary to designate a destination date. Thus, the apparatus can be more conveniently used.

In an embodiment, a destination date to which the schedule information is to be moved or to be copied is altered to a date previous to a holiday or a date previous to a particular day, when a day corresponding to one at which the successive coordinate input has been started and being displayed as a calendar on the calendar display region after scrolling is the holiday or the particular day. Therefore, a schedule can be automatically prevented from being moved to or copied onto a holiday or a particular day without checking that a destination date is a holiday or a particular day. Hence, the schedule can be managed easily.

In an embodiment, a destination date to which the schedule information is to be moved or to be copied is altered to a date subsequent to a holiday or a date subsequent to a particular day, when a day corresponding to a date at which the successive coordinate input has been started and being displayed as a calendar on the calendar display region after scrolling is the holiday or the particular day. Therefore, a schedule can be automatically prevented from being moved to or copied onto a holiday or a particular day without checking a destination date is a holiday or a particular day. Hence, the apparatus can be managed easily.

In an embodiment, the fourth control means extracts (n) (natural number) pieces of characters from the front of the schedule information stored in the second storing portion so that the characters are displayed in the vicinity of each coordinate inputted on the display screen by means of the coordinate input means, with changing the coordinates successively. Accordingly, the operator can easily check whether or not the second storing portion holds the content of the schedule and check the content of the held schedule. Thus, the apparatus can be more conveniently used.

In an embodiment, the retrieval means retrieves words stored in the word storing portion according to the schedule information stored in the second storing portion. The fifth control means for issuing an instruction to display a character indicating a word retrieved by the retrieval means from the schedule information stored in the second storing portion in the vicinity of a coordinate inputted on the display screen by means of the coordinate means. Thus, the operator can easily check whether or not the second storing portion holds the content of the schedule and check the content of the held schedule. Thus, the apparatus can be more conveniently used.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIGS. 8A through 8D are views each exemplifying a display screen of the schedule-managing apparatus shown in FIG. 1;

DETAILED DESCRIPTION OF THE PREFERRED EMBODIMENTS

Figure 1:
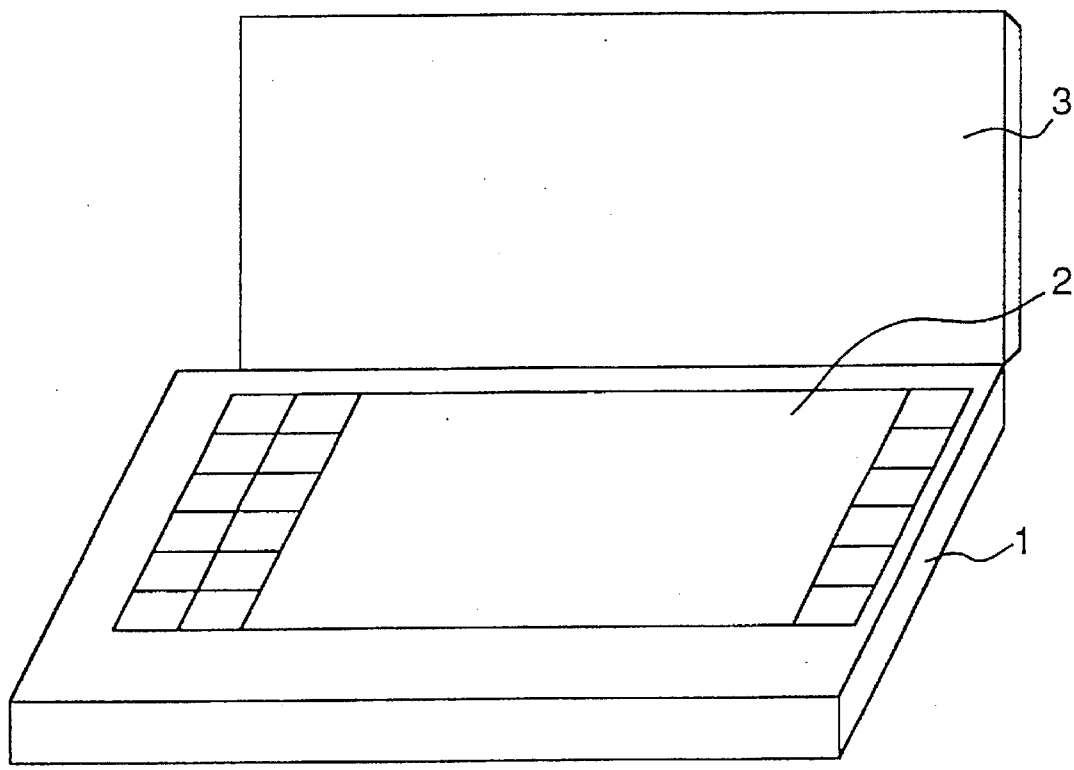
FIG. 1 is a perspective view showing the outlook of a compact schedule-managing apparatus according to an embodiment of the present invention.

Before the description of the present invention proceeds, it is to be noted that like parts are designated by like reference numerals throughout the accompanying drawings.

A schedule-managing apparatus according to an embodiment of the present invention is described below with reference to the drawings.

FIG. 1 is a perspective view showing the outlook of a portable compact schedule-managing apparatus.

A cabinet 1 of the schedule-managing apparatus incorporates an input/output section 2; a control circuit controls the entire apparatus as described later; and a power source for supplying electricity to required portions, etc. The cover 3 is mounted on the rear surface of the cabinet 1 with a hinge and hence is pivoted. When the apparatus is carried, the cover 3 pivots to protect the input/output section 2.

Figure 2:
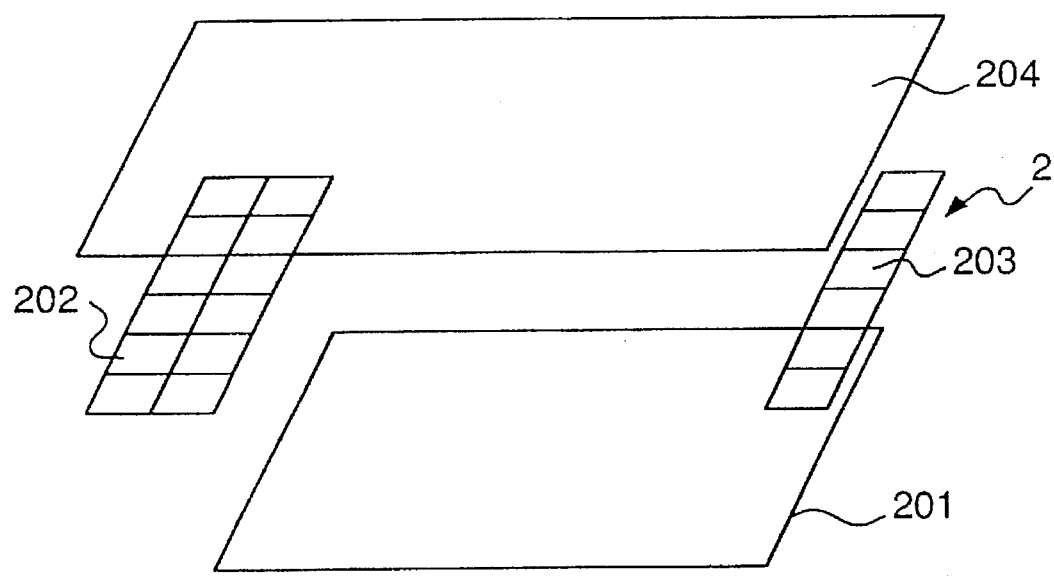
FIG. 2 is a perspective view showing an input/output section of the compact schedule-managing apparatus shown in FIG. 1 in an exploded state.

FIG. 2 is a perspective view showing the input/output section 2 shown in FIG. 1 in an exploded state. The input/output section 2 comprises a liquid crystal display portion 201; a mode selection key 202; a function selection key 203; and a transparent tablet 204 serving as a coordinate-input device. The input/output section 2 has alphanumeric input keys (not shown) serving as an information-input device.

The liquid crystal display portion 201 of matrix type is thin and capable of displaying characters thereon. The liquid crystal display portion 201 may have a backlight composed of an EL panel or the like on the rear surface thereof if necessary.

The transparent tablet 204 is composed of, for example, two transparent sheets and two transparent electrodes each of which is mounted on the inner surface of each of the transparent sheets. The two transparent electrodes are opposed to each other via a small projected spacer such that they do not contact each other in a normal state. The area of the transparent tablet 204 is so large that it may cover entirely the liquid crystal display portion 201, mode selection key 202 and the function selection key 203 which are placed by the left and right side of the liquid crystal display portion 201 respectively.

The mode selection key 202 is used to select a mode from among a schedule mode for managing a schedule; a telephone directory mode for managing a telephone number; a computer mode for performing calculations by a desk computer; and a world clock mode for checking times in cities of the world.

The function selection key 203 is used to select a clearing function, the control function of a cursor or the like to be used commonly to every mode selected by the mode selection key 202.

Names (symbols) of the modes and those of the functions are printed on a sheet to form the mode selection key 202 and the function selection key 203. The mode selection key 202 and the function selection key 203 function as switches when they are combined with the transparent tablet 204. That is, an operator presses, namely, indicates a required symbol printed on the mode selection key 202 or the function selection key 203 with a pen. As a result, the two transparent electrodes of the transparent tablet 204 are brought into contact with each other at a position corresponding to the indicated position. As a result, the indicated position is detected. Similarly, when the operator indicates a desired position of the liquid crystal display portion 201, the content displayed on the liquid crystal display portion 201 and position information are synchronized with each other. In this manner, the indicated position of the liquid crystal display portion 201 is detected.

Figure 3:
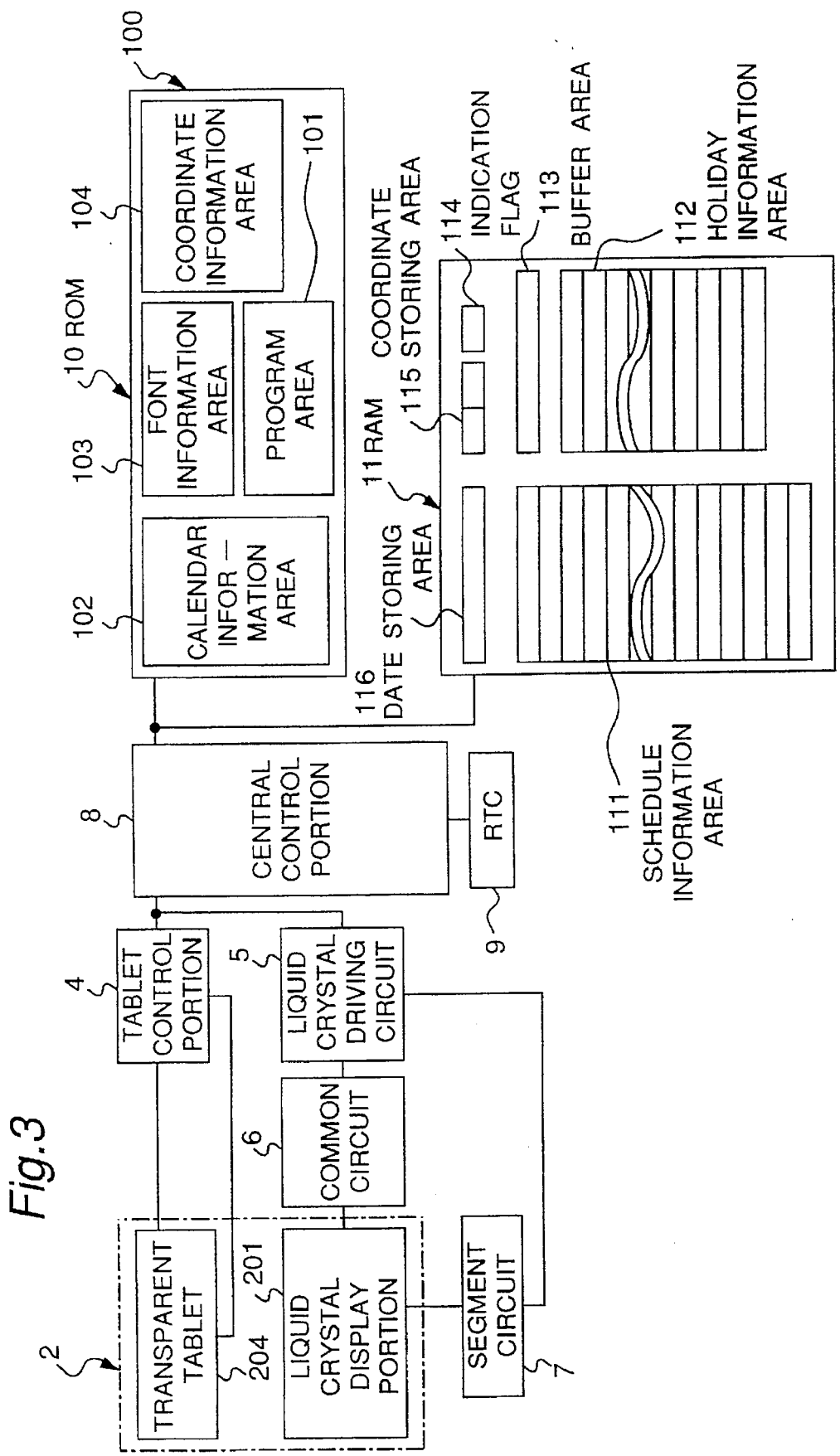
FIG. 3 is a block diagram showing a schematic construction of an entire control circuit of the schedule-managing apparatus shown in FIG. 1.

FIG. 3 is a block diagram showing a schematic construction of the entire control circuit 100 of the schedule-managing apparatus.

The control circuit 100 includes a tablet control portion 4; a liquid crystal-driving circuit 5; a common circuit 6; a segment circuit 7; a central control portion 8 serving as first through fifth control means; an RTC (real time clock) 9; a ROM (read only memory) 10; and a RAM (random access memory) 11.

The tablet control portion 4 is a constituent element for fetching coordinate information from the transparent tablet 204. The tablet control portion 4 is connected with the transparent electrode provided on one of the transparent sheets of the transparent tablet 204 and with the transparent electrode provided on the other transparent sheet thereof, so that the position indicated with the pen is detected by the contact between both transparent electrodes.

The liquid crystal-driving circuit 5 stores dot positions, as a bit map, at which liquid crystal is turned on. The liquid crystal-driving circuit 5 outputs signals to the common circuit 6 and the segment circuit 7 if necessary. Upon receipt of the signals from the liquid crystal-driving circuit 5, a display is made on the liquid crystal display portion 201 through the common circuit 6 and the segment circuit 7 which output driving signals to the liquid crystal display portion 201.

The central control portion 8 is a constituent element for controlling the entire apparatus. That is, the central control portion 8 controls input information and output information by sending instructions to necessary portions.

The RTC 9 clocks a current time, based on an unshown clock signal, thus outputting a signal indicating the current time.

The ROM 10 comprises a program area 101 storing a control program for operating the central control portion 8; a calendar information area 102 storing information such as the days of each month necessary for forming a calendar; a font information area 103 storing the fonts of characters to be displayed on the liquid crystal display portion 201; and a coordinate information area 104 for storing, as a coordinate, the position of a content displayed on the liquid crystal display portion 201, the position of each key of the mode selection key 202, and the position of each key of the function selection key 203. The content stored in the coordinate information area 104 is used to decide which of the keys corresponds to a coordinate detected by the tablet control portion 4.

The RAM 11 has a schedule information area 111 serving as a first storing portion for storing as schedule information year, month, day, time (hour), and the content of a schedule inputted by the operator at the input/output section 2; a holiday information area 112 for storing holiday information indicating memorial days or the like set arbitrarily by an operator; a buffer area 113 serving as a second storing portion for temporarily holding the content of the schedule; an indication flag 114 which is flagged when the transparent tablet 204 is kept to be inputted (pressed); a coordinate storing area 115 for storing inputted an XY-coordinate; and date storing area 116 for holding dates.

As will be described later, the central control portion 8 reads the coordinate of a schedule displayed on the liquid crystal display portion 201 and indicated by the operator via transparent tablet 204 with a pen. Then the central control portion 8 specifies the content of the schedule based on the coordinate and outputs a signal corresponding to the content. Upon receipt of the signal, the buffer area 113 holds the content of the schedule. Similarly, the central control portion 8 reads the coordinate of the schedule displayed on the liquid crystal display portion 201 and indicated by the operator via transparent tablet 204 with the pen. Then the central control portion 8 calculates a date based on the coordinate and outputs a signal corresponding to the date. Upon receipt of the signal, the date storing area 116 stores the date.

When the pen is moved to a different date with continuously pressing the transparent tablet 204, the content stored in the buffer area 113 is not changed, whereas the content stored in the date storing area 116, is renewed correspondingly.

Figure 4:
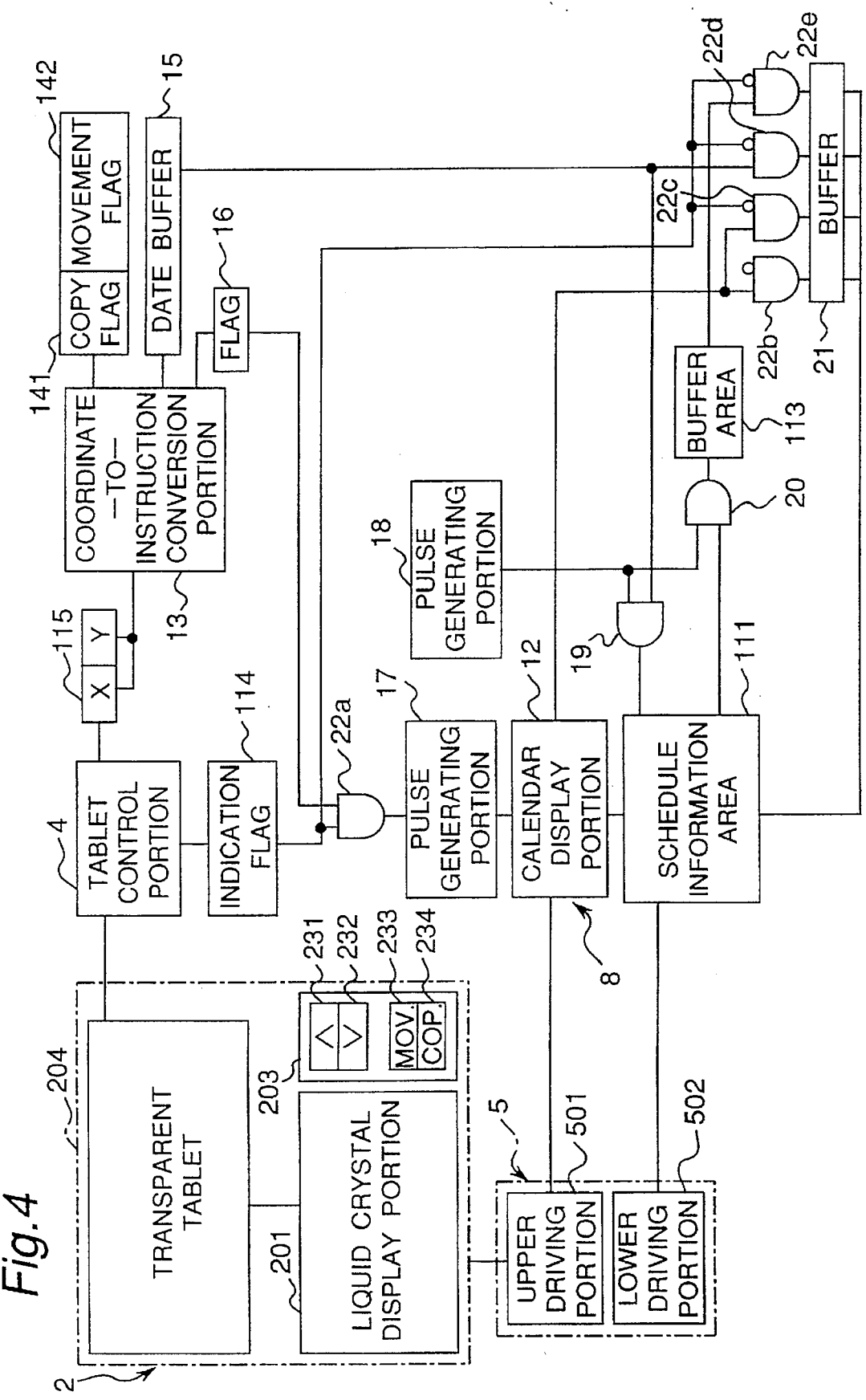
FIG. 4 is a block diagram showing a part of the control circuit shown in FIG. 3 in detail.

FIG. 4 shows a part of the control circuit shown in FIG. 3 in detail.

The function selection key 203 comprises the following symbols printed on a sheet as described previously: A return key 231 for returning a month displayed on the calendar to the previous month; an advance key 232 for advancing a month displayed on the calendar to the subsequent month; a copy indication key 234 for instructing the copy of a schedule; and a movement indication key 233 for instructing the movement of a schedule.

The central control portion 8 includes a coordinate-to-instruction conversion portion 13 for converting a coordinate transmitted to a coordinate storing area 115 into an instruction with reference to the coordinate information area 104 (see FIG. 3); and a calendar display portion 12 for generating calendar display information to be used to display the calendar, based on the instruction, thus outputting the calendar display information to an upper driving portion 501 of the liquid crystal-driving circuit 5.

(1) Description is made below on an operation for moving a schedule of a date of a month to the position of a different day of the same month or copying a schedule of a date of a month onto the position of a different day of the same month.

When the schedule mode is selected, a current date is extracted from the RTC 9. Based on the information in the calendar information area 102 (see FIG. 3) of the ROM 10, the calendar display portion 12 outputs calendar display information to the upper driving portion 501 of the liquid crystal-driving circuit 5. As a result, the calendar of the month is displayed on a calendar display region 201A (see FIG. 8A) positioned on an upper region of the liquid crystal display portion 201. Based on the information in the schedule information area 111, the schedule content of the current date is outputted to a lower driving portion 502 of the liquid crystal-driving circuit 5. As a result, the schedule content of the current date is displayed on a schedule display region 201B (see FIG. 8A) positioned on a lower region of the liquid crystal display portion 201.

(1)-1 First, the calendar of the starting month, i.e. the month on which a to-be-moved schedule or a to-be-copied schedule has been stored is displayed on the calendar display region 201A by pressing, with the pen, the return key 231 or the advance key 232 serving as a scroll indication window.

If the operator wants to have the calendar of the next month displayed on the calendar display region 201A, the operator touches the advance key 232 with the pen. As a result, the coordinate XY of the position of the advance key 232 is detected by the tablet control portion 4. Then, the coordinate XY is supplied to the coordinate storing area 115. The coordinate-to-instruction conversion portion 13 then converts the coordinate XY into an instruction with reference to the coordinate information area 104 (see FIG. 3). The instruction is executed by the calendar display portion 12 so as to display the calendar of the next month on the liquid crystal display portion 201. Similarly, when the operator indicates the return key 231, the calendar of the month previous to the current month is displayed on the liquid crystal display portion 201.

When the return key 231 or the advance key 232 is pressed on the transparent tablet, a flag 16 is set accordingly.

(1)-2 After the calendar of the next month is displayed on the liquid crystal display portion 201 as a result of the operation executed as described in (1)-1, the operator selects the movement of the schedule or the copy thereof by pressing the movement indication key 234 or the copy indication key 233. As a result, the coordinate of the position of the copy indication key 233 or that of the movement indication key 234 is detected by the tablet control portion 4. The signal indicating the coordinate XY is supplied to the coordinate storing area 115. Then, the coordinate-to-instruction conversion portion 13 converts the coordinate XY into an instruction with reference to the coordinate information area 104 (see FIG. 3). Based on the instruction, a copy flag 141 is set if the copy indication key 233 is selected or a movement flag 142 is set if the movement indication key 234 is selected.

(1)-3 Then, the operator presses the position of the starting date, of the calendar, the schedule of which is to be moved or to be copied has been stored. When the date is indicated on the transparent tablet 204, the date is stored by the date buffer 15. When pulse signals generated by pulse generation circuit 18 are supplied to an AND circuit 19, the date buffer 15 outputs a signal indicating the date stored therein to the lower driving portion 502 through a gate comprising the AND circuit 19 and the schedule information area 111. Upon receipt of the signal transmitted from the lower driving portion 502, the liquid crystal display portion 201 displays the date on the lower region thereof. At the same time, the schedule of the date stored in the schedule information area 111 is supplied to the buffer area 113 via an AND circuit 20 and stored in the buffer area 113.

While the tablet control portion 4 is detecting that the transparent tablet 204 is successively pressed with the pen, the indication flag 114 is set. The buffer area 113 holds the schedule as far as the indication flag 114 is set.

(1)-4 When the tablet control portion 4 does not detect the transparent tablet 204 being pressed any more, i.e., when the indication flag 114 is cleared, the schedule content stored by the buffer area 113, the destination date (day corresponding to a position, of the calendar display region, at which the transparent tablet 204 is not pressed any more), indicated by the date buffer 15, of a different month to which the schedule of the date is moved or onto which the schedule thereof is copied, and the year and the month indicated by the calendar display portion 12 are transferred to a buffer 21 via gates 22b, 22c, 22d, and 22e. The content of the schedule is stored in the schedule information area 111. In this manner, the movement of the schedule or the copy thereof is completed. In the case of the movement of the schedule, the to-be-moved schedule is erased.

(2) Description is made below on an operation for moving forward or backward a displayed calendar of a month, with a schedule of a to-be-moved or to-be-copied date held.

While the tablet control portion 4 detects that the transparent tablet 204 is continuously pressed, the indication flag 114 is set. While the indication flag 114 is set, a schedule is held in the buffer area 113.

When the operator presses the transparent tablet 204 successively with the pen so as to keep schedule and moves the pen from the calendar display region to the position of the return key 231 or that of the advance key 232, the flag 16 is set by the coordinate-to-instruction conversion portion 13.

Because the transparent tablet 204 is continuously pressed, the indication flag 114 is already set. Because the flag 16 and the indication flag 114 are simultaneously set, a signal indicating these flags is transmitted to a pulse generating portion 17 via an AND circuit 22a. Upon receipt of the signal, the pulse generating portion 17 generates a pulse, having a specific width, indicating the return of a current month to a past month or the advance of the current month to a future month. Upon receipt of the pulse, the upper driving portion 501 is operated, with the result that the calendar of a desired month is displayed on the liquid crystal display portion 201.

Let it be supposed that the operator moves the pen away from the position of the return key 231 or that of the advance key 232 so as to clear the flag 16, with the schedule held, and then, moves the pen again to the position of the return key 231 or that of the advance key 232. As a result, a signal indicating a forward or backward movement of the displayed month can be generated. That is, this operation allows a desired month to be displayed on the liquid crystal display portion 201.

Figure 5:
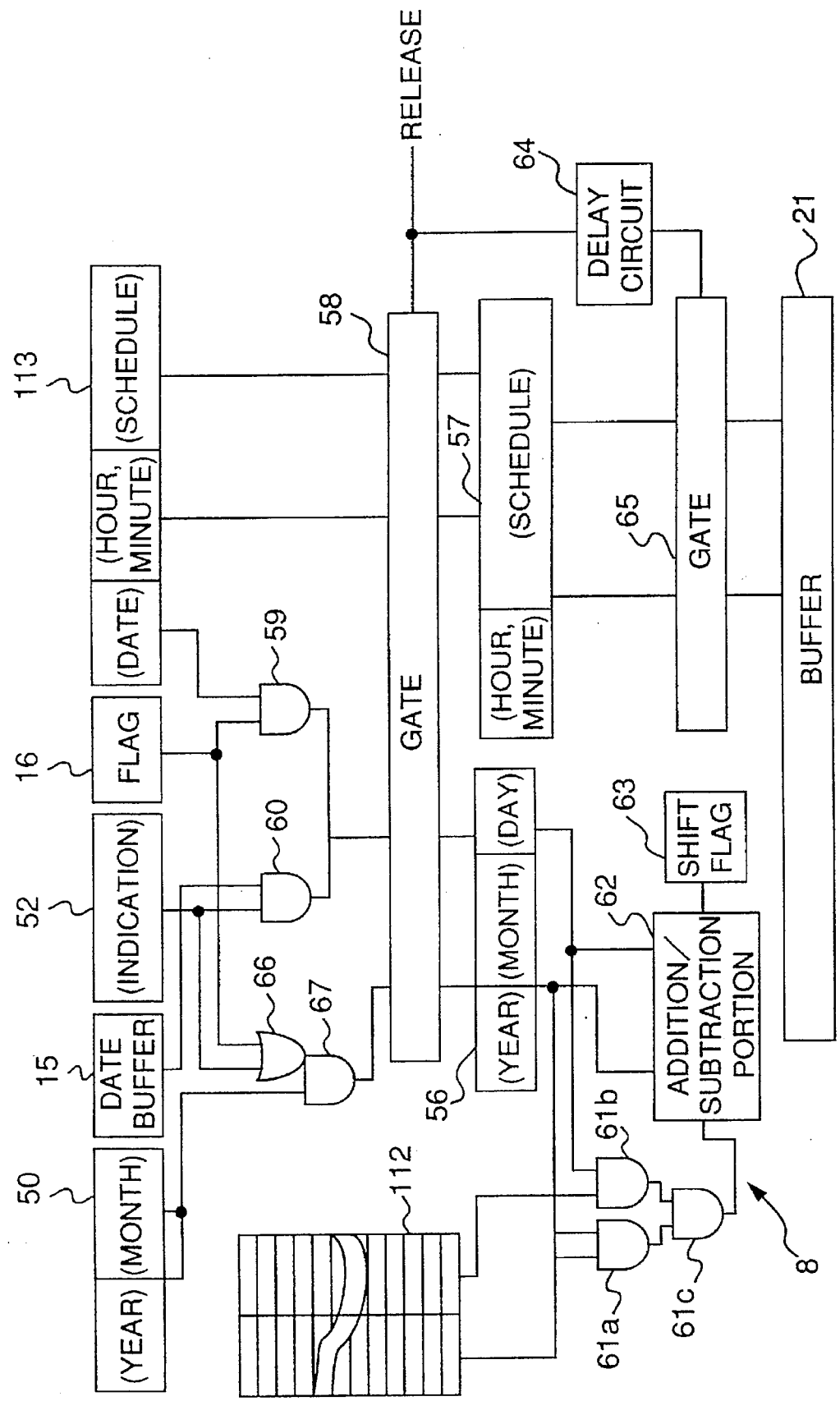
FIG. 5 is a block diagram showing a part of the control circuit shown in FIG. 3 in detail.

FIG. 5 shows a part of the control circuit shown in FIG. 3 which is partly similar to FIG. 4.

Referring to FIG. 5, a signal 50 indicates the information, of the year and the month of the displayed calendar, supplied from the calendar display portion 12 (see FIG. 4). A signal 52 indicates that a calendar-displayed position has been displayed.

The central control portion 8 includes an addition/subtraction portion 62 for performing addition or subtraction with reference to the setting content of a shift flag 63. That is, the addition/subtraction portion 62 performs a subtraction when the shift flag 63 is set to "0" and an addition when it is set to "1", in case a date of a different month to which the schedule of a current date is moved or copied is a holiday. The addition/subtraction portion 62 outputs the information of a year, month, and day amended by the subtraction or the addition.

(1) Initially, an operation for moving the schedule of a starting date to the same day of a different month (destination date) or copying the schedule of a starting date onto the same day of a different month (destination date) is described below.

When the pen is in the calendar display region 201A of the transparent tablet 204, the schedule information of a date indicated with the pen, namely, the date/hour and minute/schedule is stored in the buffer area 113.

In order to move or copy the schedule of the date of a month to the same day of a different month, the operator moves the pen to the position of the return key 231 or that of the advance key 232 to hold the schedule at the position of the return key 231 or that of the advance key 232, i.e., to complete an input on the transparent tablet 204.

When the instruction made by means of the return key 231 or the advance key 232 is canceled, namely, upon completion of an input, a gate 58 is opened. As a result, the information of year/month/day is stored in a first buffer 56 and the information of hour and minute/schedule is stored in a second buffer 57.

Upon completion of the input at the position of the return key 231 or that of the advance key 232, an AND circuit 59 is opened upon receipt of a signal outputted thereto from the flag 16. Thus, date information stored in the buffer area 113 is outputted to the first buffer 56 via the gate 58 and stored therein. At this time, because the pen is already at the position of the return key 231 or that of the advance key 232, a required calendar is displayed on the liquid crystal display portion 201, and a signal 50 indicating a numerical value corresponding to a destination month is outputted to the gate 58 via an AND circuit 67. That is, the information of the year and the month (destination date) is stored by the first buffer 56.

As described above, the schedule of the current date of the month is moved or copied to the same date of the different month.

(2) An operation to be performed when an input operation is completed on a certain date on the calendar display region 201A displayed on the liquid crystal display portion 201 is described below.

When the pen is in the calendar display region 201A of the transparent tablet 204, the schedule information of a date indicated with the pen, namely, the date/hour and minute/schedule is stored in the buffer area 113.

Upon completion of an input on the transparent tablet 204, the gate 58 is opened. As a result, the information of year/month/day is stored in the first buffer 56, while the information of hour and minute/schedule is stored in the second buffer 57.

More specifically, when the input is completed on the display region 201A of the calendar, the date buffer 15 outputs date information indicating a date corresponding to the input completion position to the first buffer 56 via an AND circuit 60 and at the same time, the signal 50 indicating year/month information is outputted thereto via the AND circuit 67. The date information and the year/month information thus transmitted to the first buffer 56 are stored therein with the opening of the gate 58 at the completion of the input. At the same time, information of hour and minute/schedule is outputted from the buffer area 113 to the second buffer 57 via the gate 58 and stored therein.

(3) An operation to be executed when a destination day of a different month is a holiday is described below.

When the input has been completed on the transparent tablet 204 by the operation described in the above (1), a destination year/month/day is stored in the first buffer 56 and the time and minute/schedule are stored in the second buffer 57.

The information of year and month stored in the first buffer 56 is supplied to AND circuits 61a, 61b, and 61c and is compared sequentially with the information of year/month outputted from the holiday information area 112. If both are coincident with each other, i.e., if a destination date is a holiday, the AND circuits 61a, 61b, and 61c output corresponding signals to the addition/subtraction portion 62.

Upon receipt of a signal indicating the year and month from the first buffer 56, the addition/subtraction portion 62 performs additions and subtractions, based on the content of the shift flag 63.

If a destination date is a holiday, in case the operator desires to amend the set date to the date previous thereto, the shift flag 63 is set to "0" or in case the operator desires to amend the set date to the date subsequent thereto, the shift flag 63 is set to "1".

If a destination date is a holiday, the addition/subtraction portion 62 performs a subtraction when the shift flag 63 is set to "0", while the addition/subtraction portion 62 performs an addition when the shift flag 63 is set to "1", thus outputting the information of the year, the month and the day amended by the subtraction or the addition.

A delay circuit 64 delays the opening of a gate 65 by a time period corresponding to the calculation time period of the addition/subtraction portion 62 after the transparent tablet 204 is not pressed any more, i.e., after a signal indicating the cancellation of the input is made. In this manner, the buffer 21 stores the amended year, month, day, hour, and minute/schedule.

If a destination date is not a holiday, the AND circuit 61a-61c does not generate a signal and thus the addition/subtraction portion 62 does not perform a calculation. In this case, the information of year and month stored in the first buffer 56 is stored in the buffer 21 as it is.

As described above, the operator can move or copy the schedule of a starting date to a destination date of a different month. Further, if a destination date is a holiday, the schedule can be stored by amending the set date to the date previous thereto or to the date subsequent thereto.

Figure 6:
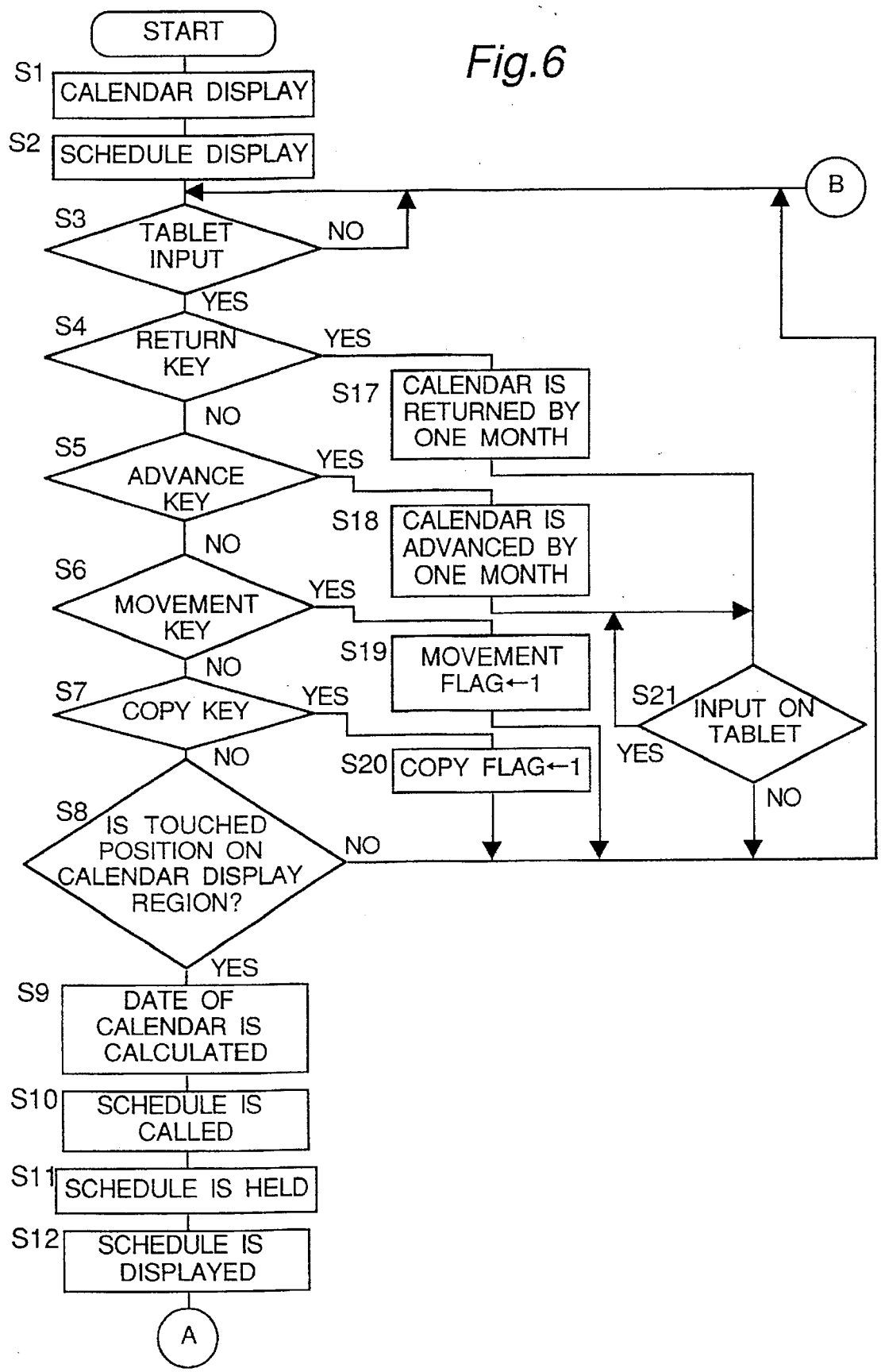
FIG. 6 is a flowchart showing the operation of the schedule-managing apparatus shown in FIG. 1.

(4) The operations of the above (1) through (3) are described in detail below by using the flowcharts shown in FIGS. 6 and 7.

First, at step S1, a current year/month/day is fetched from the RTC 9 (see FIG. 3) to display a calendar of one month including the current date in the upper region of the liquid crystal display portion 201.

At step S2, the schedule content of the current date shown by the RTC 9 is displayed on the lower region of the liquid crystal display portion 201. For example, if a date shown by the RTC 9 is Dec. 23, 1994 and a meeting is held at 12:30 on Dec. 23, 1994, the schedule is displayed as shown in FIG. 8A.

It is decided at step S3 whether or not the transparent tablet 204 provided on the display screen is pressed. If YES, the program goes to step S4, whereas if NO, the program returns to step S3.

It is decided at step S4 whether or not the return key 231 is touched. If YES, the program goes to step S17 at which the calendar of the previous month is displayed, whereas if NO, the program goes to step S5.

It is decided at step S5 whether or not the advance key 232 is touched. If YES, the program goes to step S18 at which the calendar of the next month is displayed, whereas if NO, the program goes to step S6.

After the processing of step S17 and step S18 terminates, the program goes to step S21 at which it is decided whether or not the pen has been moved away from the transparent tablet 204. If it is decided that the pen is still on the transparent tablet 204, the processing of step S21 is executed again and the same processing is executed until it is decided that the pen is not in contact with the transparent tablet 204. If it is decided that the transparent tablet 204 is not touched, the program returns to step S3. Step S21 is provided to prohibit the month displayed on the liquid crystal display portion 201 from being repeatedly returned to the previous month or advanced to the next month when the transparent tablet 204 is successively touched.

It is decided at step S6 whether or not the copy indication key 233 for instructing the movement of a schedule is touched. If YES, the program goes to step S19 at which the movement flag 142 (see FIG. 4) corresponding to YES is set, whereas if NO, the program goes to step S7.

It is decided at step S7 whether or not the movement indication key 234 for instructing the copy of a schedule is touched. If YES, the program goes to step S20 at which the copy flag 141 indicating copy function, whereas if NO, the program goes to step S8.

It is decided at step S8 whether or not the touched position is located within the calendar display region. If YES, the program goes to step S9, whereas if NO, the program returns to step S3.

At step S9, the date of the calendar touched with the pen is calculated, based on the coordinate of the touched position.

At step S10, a schedule corresponding to the date calculated at step S9 is called to hold the content of the schedule temporarily at step S11.

At step S12, the schedule called at step S10 is displayed on the lower region of the liquid crystal display portion 201.

Figure 7:
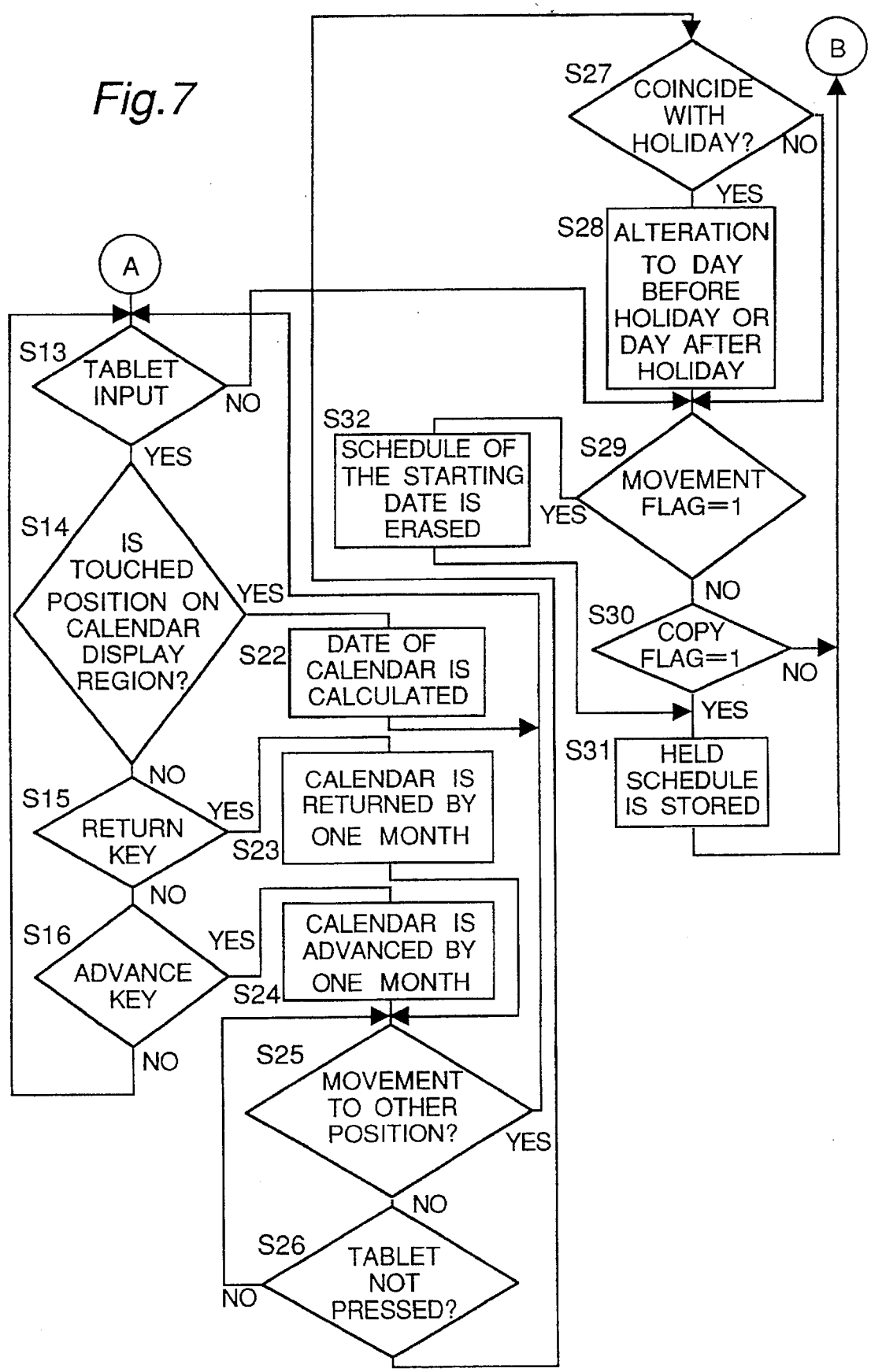
FIG. 7 is a flowchart showing the operation of the schedule-managing apparatus shown in FIG. 1.

Referring to FIG. 7, it is decided at step S13 whether the pen has been moved away from the transparent tablet 204. If the pen is on the transparent tablet 204, the program goes to step S14, whereas if the pen is not on the transparent tablet 204, the program goes to step S29.

It may be decided between step S13 and step S29 whether the date calculated at step S9 is coincident with the date (including year and month) at which the pen has been moved away from the transparent tablet 204. If YES, the program may go to step S3. In this manner, it may be possible to avoid executing unnecessary processing (step S29 through step S31).

It is decided at step S14 whether or not the touched position is located within the calendar display region. If YES, the program goes to step S22 at which the date of the touched calendar display region is calculated as done at step S9. If the touched position moves within the calendar display region, the program goes to steps S13, S14, and S22 repeatedly, with the movement of the touched position so as to calculate dates sequentially.

If it is decided at step S14 that the touched position is not located within the calendar display region, the program goes to step S15.

Processing similar to that at each of steps S4, S5, S17, and S18 is executed at each of steps S15, S16, S23, and S24 so as to return the displayed month of the calendar to the previous month or advance the month to the subsequent month when the return key 231 or the advance key 232 is touched. Then, the program goes to step S25.

It is decided at step S25 whether the pen has touched positions other than the position of the return key 231 or that of the advance key 232 on the transparent tablet 204. If YES, the program returns to step S13. Thus, the displayed month of the calendar can be returned to the previous month or advanced to the next month when the pen touches again the position of the return key 231 or that of the advance key 232.

If it is decided at step S25 that the position of the return key 231 or that of the advance key 232 is touched, the program goes to step S26.

It is decided at step S26 whether the pen is moved away from the position of the return key 231 or that of the advance key 232. If it is decided that the pen is thereon, processing is executed at steps S25 and S26 repeatedly. If it is decided that the pen has been moved away therefrom, the program goes to step S27.

It is decided at step S27 whether or not the year and month of the calendar displayed on the liquid crystal display portion 201 and the day calculated at step S9 are coincident with a holiday set by the operator. If YES, the program goes to step S28 at which the date calculated at step S9 is updated to the date previous to the holiday or the date subsequent thereto.

It is decided at step S29 whether or not the movement flag 142 is set at step S19. If YES, the program goes to step S32 at which the schedule of the date calculated at step S9 (schedule of the starting date) is erased.

It is decided at step S30 whether or not the copy flag 141 is set at step S20.

At step S31, the content of the schedule held at step S11 is stored as that of a date determined by the year and the month of the calendar on display and by a day calculated at step S22 or step S28.

In this manner, the movement of the schedule or the copy thereof is executed by keeping the pen in contact with the transparent tablet 204.

(5) The operation of the above (4) is described below in detail with reference to FIGS. 8A through 8D.

(5)-1 For example, description is made below on the case in which a current date is Dec. 20, 1994, and the schedule of Dec. 23rd, 1994 is moved to Dec. 30, 1994.

First, when the schedule mode is selected, at the steps S1 and S2, a calendar of one month including the current date is displayed in the calendar display region 210A provided in the upper region of the liquid crystal display portion 201, as shown in FIG. 8B.

As shown in FIG. 8A, when the operator indicates the starting date (the 23rd) with the pen, the schedule content of 23rd is displayed on the schedule display region 201B provided in the lower region of the liquid crystal display portion 201 (steps S9, S10, S11, S12, S13, S29, S30), if 23rd has the schedule. As shown in FIG. 8A, a meeting is held at 12:30.

Then, the operator checks the content of the schedule to be moved and touches the movement indication key 234 to select the movement of the schedule (steps S6, S19, S13). As a result, the movement flag 142 (see FIG. 4) is set.

Then, the operator moves the pen from the position of 23rd to the destination day (Dec. 30), with the operator successively placing the pen on the transparent tablet 204 (steps S9, S10, S11, S12). Then, the operator moves the pen away from the transparent tablet 204 at the position of Dec. 30 (steps S14, S22, S13).

If it is decided that the pen has been moved away from the transparent tablet 204, the schedule of the starting date (Dec. 23) is erased through steps S29 and S32.

At step S31, the content of the schedule held at step S11 is stored as that of the date calculated at step S22. In this manner, the movement of the schedule is completed.

(5)-2 Description is made below on the case in which a current date is Dec. 20, 1994, and the schedule of Dec. 23rd, 1994 is copied onto the 30th of the next month.

First, at steps S1 and S2, a calendar of one month including the current date is displayed in the calendar display region 201A, and the schedule is displayed on the schedule display region 201B, as shown in FIG. 8B.

As shown in FIG. 8A, when the operator indicates the starting date (23rd) with the pen, the content of the schedule of 23rd is displayed on the lower region of the liquid crystal display portion 201 (steps S9, S10, S11, S12, S13, S29, S30), if 23rd has the schedule. As shown in FIG. 8A, a meeting is held at 12:30.

Then, the operator checks the content of the schedule to be copied and touches the copy indication key 233 to select the copy of the schedule (steps S7, S20, S3). As a result, the copy flag 141 (see FIG. 4) is set.

Then, the operator moves the pen from the position of 23rd to the position of the advance key 232, with the operator successively placing the pen on the transparent tablet 204 (steps S9, S10, S11, S12) so as to display the calendar of the next month (steps S13, S16, S24), as shown in FIG. 8C.

If the operator does not move the pen from the position of the advance key 232 at this time, subsequent months can be prevented from being displayed one after another on the liquid crystal display portion 201. If the operator wants, a calendar of two months after the current date to be displayed, he moves the pen away from the position of the advance key 232 while keeping successive contact between the pen and the transparent tablet 204 and then moves the pen again into the advance key 232 (steps S25, S26). Thus, the calendar is displayed on the calendar display region.

Then, the operator moves the pen to the position of the destination date (30th) and moves the pen away therefrom (steps S14, S22, S13).

When it is decided that the pen has been moved away from the position of the date 30th, at step S31, the content of the schedule held at step S11 is stored as that of the date calculated at step S22. In this manner, the copy of the schedule is completed.

(5)-3 Description is made below on the case in which a current date is Dec. 20, 1994, and the schedule of Dec. 23rd, 1994 is copied on the 23rd of the next month.

First, at steps S1 and S2, a calendar of one month including the current date is displayed in the calendar display region 201A, and the schedule is displayed on the schedule display region 201B, as shown in FIG. 8B.

As shown in FIG. 8A, when the operator indicates 23rd with the pen, the schedule content of 23rd is displayed on the lower region of the liquid crystal display portion 201 (steps S9, S10, S11, S12, S13, S29, S30), if 23rd has the schedule. As shown in FIG. 8A, a meeting is held at 12:30.

Then, the operator checks the content of the schedule to be copied and touches the copy indication key 234 to select the copy of the schedule (steps S6, S19, S13). As a result, the copy flag 141 (see FIG. 4) is set.

Then, the operator moves the pen from the position of the date 23rd to the position of the advance key 232 while keeping successive contact between the pen and the transparent tablet 204 (steps S9, S10, S11, S12) so as to display the calendar of the next month (steps S13, S16, S24), as shown in FIG. 8C.

At this time, the operator does not move the pen from the position of the advance key 232. Thus, subsequent months can be prevented from being displayed one after another on the liquid crystal display portion 201.

Then, the operator moves the pen away from the position of the advance key 232 (steps S14, S22, S13).

When it is decided that the pen has been moved away from the advance key 232, at step S31, the content of the schedule held at step S11 is stored as that of the date calculated at step S22. In this manner, the copy of the schedule is completed.

If the destination date (Jan. 23, 1995) is set as a holiday, at step S28, the date is renewed to the date previous to the holiday or the date subsequent thereto (step S27, S28).

In the description of the above (5), date is designated by indicating a schedule. But it is possible to designate a schedule displayed on the schedule display region 201B.

Figure 9:
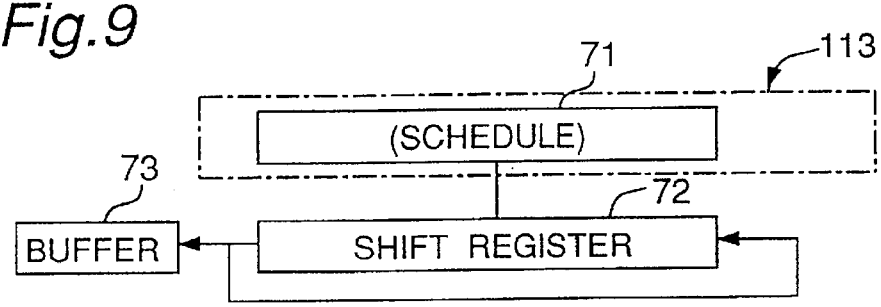
FIG. 9 is a block diagram showing a part of the control circuit shown in FIG. 3 in detail.

FIG. 9 is a block diagram showing in detail a part of the control circuit shown in FIG. 4.

Referring to FIG. 9, a schedule-storing portion 71 of the buffer area 113 shown in FIG. 4 stores the content of a schedule except time information. Schedule information held in the schedule-storing portion 71 is transferred to a shift register 72.

The shift register 72 outputs a specific number of characters of received schedule information to a holding buffer 73. The holding buffer 73 is capable of storing the specific number of characters. For example, when the schedule-storing portion 71 of the buffer area 113 stores "meeting attend" as a schedule content, the schedule content "meeting attend" is transferred to the shift register 72 as it is. AS a result, one word from the front of the schedule content is stored in the holding buffer 73. The content held in the holding buffer 73 is displayed in the vicinity of the coordinate value stored in the coordinate storing area 115. For example, when 25th is indicated by the pen, "meeting" is displayed in the vicinity of the position touched by the pen, as shown in FIG. 8D.

Figure 10:
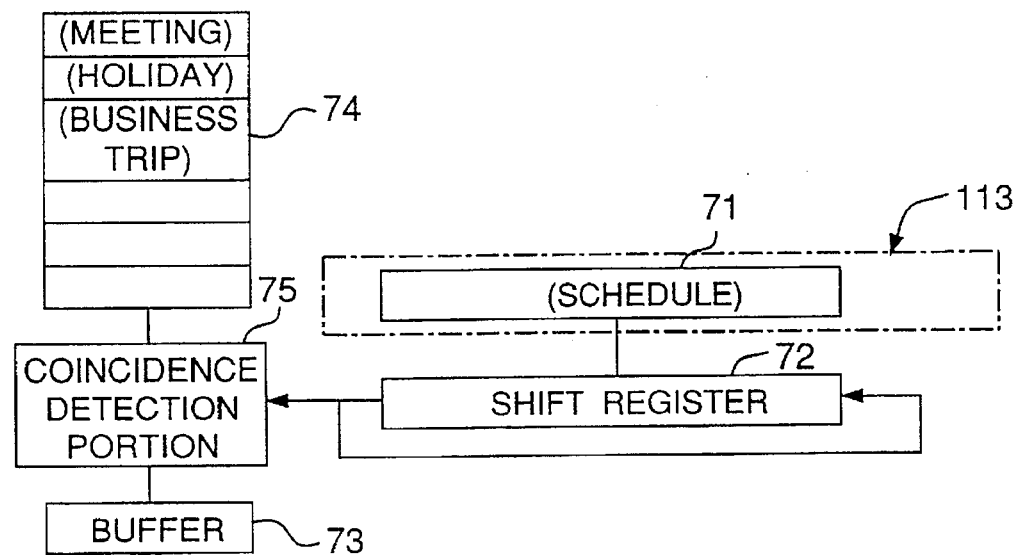
FIG. 10 is a view showing a modification of the control circuit of the schedule-managing apparatus shown in 8A through 8D.
Figure 11:
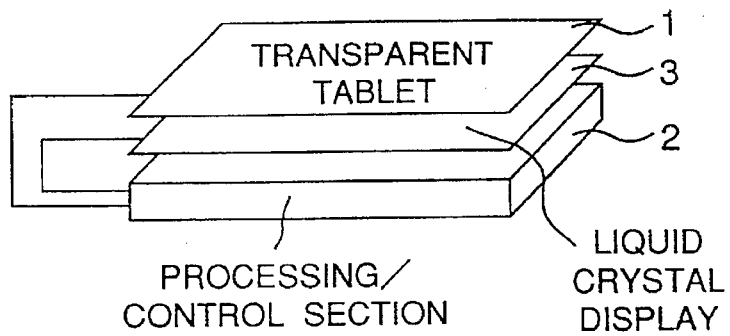
FIG. 11 is a perspective view showing a conventional compact schedule-managing apparatus.
Figure 12:
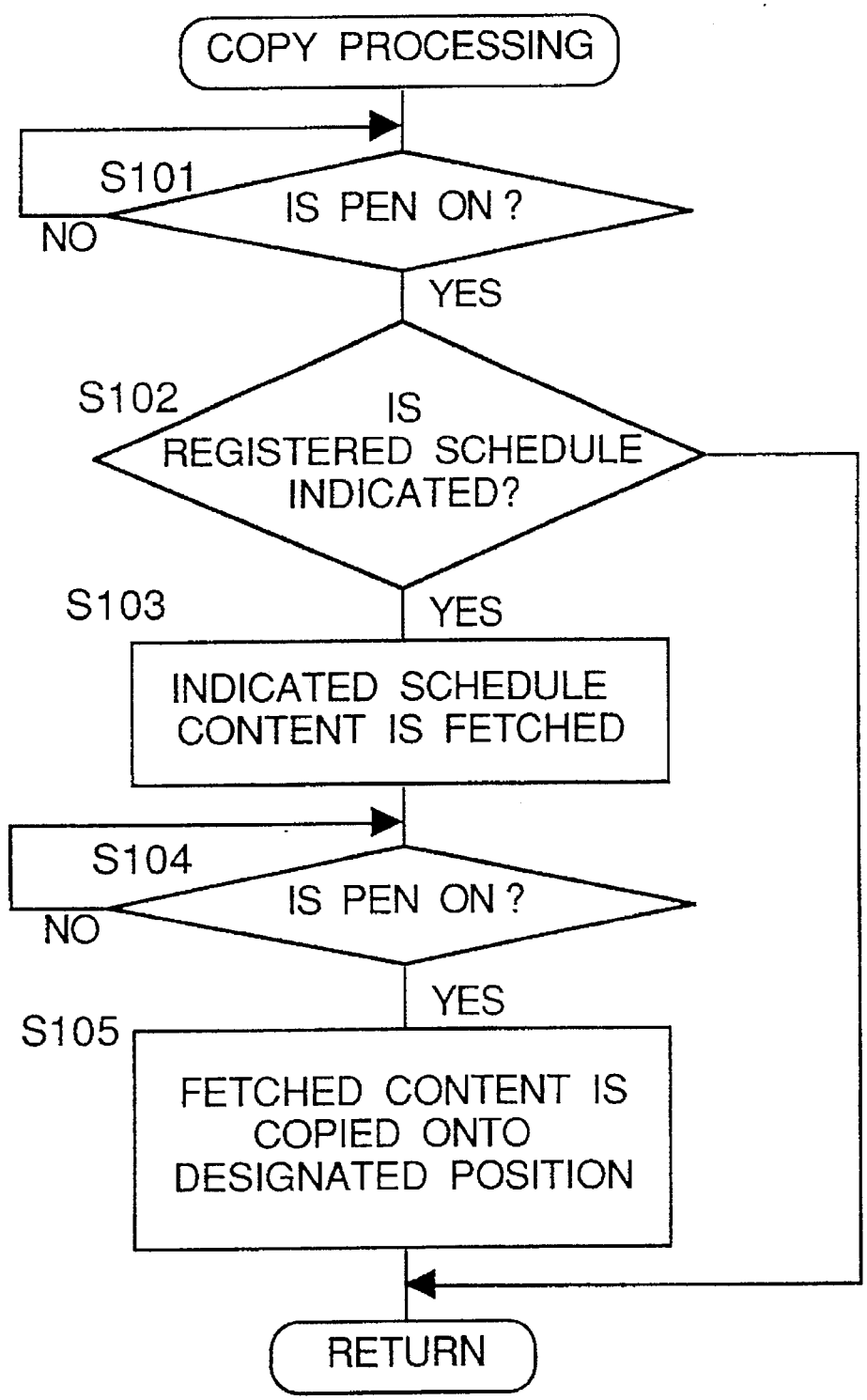
FIG. 12 is a flowchart showing the operation of the conventional compact schedule-managing apparatus.

FIG. 10 is a view showing a modification of FIG. 9. That is, the circuit shown in FIG. 9 further includes a word storing portion 74 and a coincidence detection portion 75 serving as a retrieval device. The word storing portion 74 stores words such as "meeting", "holiday", "business trip" and the like frequently used.

For example, assuming that "meeting for sale-promotion" is stored in the schedule-storing portion 71 of the buffer area 113 as a schedule content, the schedule content is transferred to the shift register 72 as it is. The coincidence detection portion 75 compares the words stored in the word storing portion 74 with the schedule characters sequentially transmitted from the shift register 72. If any one of the schedule characters is coincident with one of the words stored by the word storing portion 74, the coincidence detection portion 75 outputs a signal corresponding to the word to the holding buffer 73. In this example, "meeting" which is a coincident word is transmitted from the coincidence detection portion 75 to the holding buffer 73. Upon receipt of a signal corresponding to "meeting", the holding buffer 73 stores the word "meeting". As in the case of the circuit shown in FIG. 9, the content stored in the holding buffer 73 is displayed in the vicinity of the coordinate value stored by the coordinate storing area 115. For example, as shown in FIG. 8D, when 25th is indicated by the pen, the word "meeting" is displayed in the vicinity of the position touched by the pen.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A schedule-managing apparatus comprising: information input means for inputting date information indicating a date and schedule information indicating a schedule content;
   a first storing portion for storing the date information inputted by the information input means and the schedule information corresponding to the date information, in correspondence to each other;
   a display portion allowing a calendar of a certain period of time to be displayed on a calendar display region of a display screen;
   coordinate input means for inputting a coordinate on the display screen of the display portion;
   a second storing portion capable of storing the date information of a date corresponding to the coordinate inputted by the coordinate input means and the schedule information of the date;
   first control means for extracting date and corresponding schedule information corresponding to the coordinate inputted by the coordinate input means from the first storing portion and for controlling the second storing portion to store the extracted date and schedule information when a coordinate input is started in the calendar display region by the coordinate input means, and for controlling the second storing portion to maintain the schedule information as it is and to renew the date information according to inputted coordinates, when the inputted coordinates are changed successively in the calendar display region;
   second control means for moving or copying the schedule information stored in the second storing portion in correspondence to renewed date indicated by the date information stored in the second storing portion, when the coordinate input means has completed the successive coordinate-input,
   wherein a scroll indication window is provided adjacent to the display screen of the display portion such that the scroll indication window allows a coordinate thereof to be inputted continuously to the display screen by use of the coordinate input means; and
   third control means for scrolling a content displayed on the display screen when the coordinate of the scroll indication window is inputted by use of the coordinate input means.

2. The schedule-managing apparatus according to claim 1, wherein the third control means scrolls the content displayed on the calendar display region by a predetermined amount, when the coordinate of the scroll indication window is inputted by use of the coordinate input means.

3. The schedule-managing apparatus according to claim 1, wherein the display screen of the display portion includes the calendar display region allowing a calendar of a month to be displayed thereon and a schedule display region allowing the schedule information to be displayed thereon.

4. The schedule-managing apparatus according to claim 2, wherein the display screen of the display portion includes the calendar display region allowing a calendar of a month to be displayed thereon and a schedule display region allowing the schedule information to be displayed thereon.

5. The schedule-managing apparatus according to claim 2, wherein under the control of the third control means, the content of the calendar display region is scrolled by one month for one input of the coordinate performed at the scroll indication window with the coordinate input means.

6. The schedule-managing apparatus according to claim 3, wherein under the control of the third control means, the content of the calendar display region is scrolled by one month for one input of the coordinate performed at the scroll indication window with the coordinate input means.

7. The schedule-managing apparatus according to claim 3, wherein when the successive coordinate input has been terminated at the position of the scroll indication window with the coordinate input means, the second control means moves or copies the schedule information stored in the second storing portion to a date, the day of which is one at which a successive coordinate input has been started and the month of which is one displayed on the calendar display region after scrolling.

8. The schedule-managing apparatus according to claim 4, wherein when the successive coordinate input has been terminated at the position of the scroll indication window with the coordinate input means, the second control means moves or copies the schedule information stored in the second storing portion to a date the day, of which is one at which a successive coordinate input has been started and the month of which is one displayed on the calendar display region after scrolling.

9. The schedule-managing apparatus according to claim 7, further including means for altering a destination date to which the schedule information is to be moved or to be copied to a date previous to a holiday or a date previous to a particular day, when a day corresponding to one at which the successive coordinate input has been started and being displayed as a calendar on the calendar display region after scrolling is the holiday or the particular day.

10. The schedule-managing apparatus according to claim 7, further including means for altering a destination date to which the schedule information is to be moved or to be copied to a date subsequent to a holiday or a date subsequent to a particular day, when a day corresponding to one at which the successive coordinate input has been started and being displayed as a calendar on the calendar display region after scrolling is the holiday or the particular day.

11. The schedule-managing apparatus according to claim 1, further including a fourth control means for extracting (n), n being a natural number, pieces of characters from the front of the schedule information stored in the second storing portion so that the characters are displayed in the vicinity of each coordinate inputted on the display screen by use of the coordinate input means, with changing the coordinates successively.

12. The schedule-managing apparatus according to claim 1, further including:

a word storing portion for storing words to be used to indicate a schedule content;

retrieval means for retrieving words stored in the word storing portion according to the schedule information stored in the second storing portion; and fifth control means for issuing an instruction to display a character indicating a word retrieved by the retrieval means from the schedule information stored in the second storing portion in the vicinity of a coordinate inputted on the display screen by use of the coordinate means.

* * * * *